(12) United States Patent
Roth et al.

(10) Patent No.: US 8,719,131 B1
(45) Date of Patent: *May 6, 2014

(54) ALLOCATING FINANCIAL RISK AND REWARD IN A MULTI-TENANT ENVIRONMENT

(75) Inventors: Gregory B. Roth, Seattle, WA (US); Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,283

(22) Filed: Mar. 29, 2012

(51) Int. Cl.
*G06Q 40/00* (2012.01)

(52) U.S. Cl.
USPC .......................................................... 705/35

(58) Field of Classification Search
USPC .......................................................... 705/35
See application file for complete search history.

(56) References Cited

FOREIGN PATENT DOCUMENTS

| AU | 2002319001 | * | 7/2002 | ............... G06F 17/60 |
| CA | 2 663 475 | * | 9/2007 | ............... H04L 12/24 |

OTHER PUBLICATIONS

Deloitte Consulting: Cloud Computing—Forecasting Change, Oct. 2009, pp. 1-33.*
IBM: Method to manage reservation and allocation of scarce resources shared by tenants in massively muti-tenant environment, an IP.com Prior Art Database Technical Disclosure, Oct. 12, 2009, pp. 1-7.*

* cited by examiner

*Primary Examiner* — Bijendra K Shrestha
(74) *Attorney, Agent, or Firm* — Novak Druce Connolly Bove + Quigg LLP (57) ABSTRACT

Multi-tenant resources can be funded using payment submitted with requests for those resources, such that the resources do not need to be associated with a specific user account. A resource can be allocated and available as long as payment has been provided. If a user wants the resource to be available for additional processing, for example, the user can submit another request with additional funding. The funding can come in the form of donations from any user, or in the form of investments where the investor expects some return on the investment in the form of revenue, visibility, or other such compensation. One or more management components can track funding for various resources, can accept and select bids for period of sponsorship, and can manage various donation models.

17 Claims, 5 Drawing Sheets

ALLOCATING FINANCIAL RISK AND REWARD IN A MULTI-TENANT ENVIRONMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. In many cases, the costs of running a Web site, application, or other offering using these resources can become significant when many users utilize these offerings. Conventional approaches to funding these offerings can be somewhat limited, and in some cases can result in the offering no longer being available when an owner of a resource cannot afford to maintain an offering. Further, sometimes a customer only needs a resource for a specific task or period of time, and conventional approaches to obtaining the resources whereby a user must obtain an account, set up a resource usage schedule, and perform other such tasks can decrease the efficiency of various processes.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing aspects of multi-tenant resources in an electronic environment. In particular, various embodiments provide mechanisms for accessing, utilizing, and funding the usage of resources that, in at least some embodiments, do not require those resources to have a specific owner or dedicated source of funding.

In some embodiments, resources can be provided that are not associated with a particular customer or account. For example, a database instance or application server instance can be created, maintained, and utilized without being associated with a particular customer account. In some embodiments, a customer can be enabled to submit a request for a resource, where the request includes or specifies a source of funding (e.g., electronic cash). The resource then can be made available for an amount of time, processing capacity, data transfer, or other such parameter corresponding to an amount of funding specified by the request. If the customer wants the resource to be available for an additional period of time, the user can submit an additional request specifying an additional amount of funding to be applied to operation of the resource. In some embodiments the user can submit an amount of funding with each request for a task to be performed using a resource, where the amount of funding should be sufficient to perform the task. The customer can receive an identifier for the resource to utilize for subsequent requests or communications with that resource during the period of operation.

In some embodiments other customers or users can submit requests to use resources that were not started by those customers or users, where the requests can include funding for the resources. For example, a user of a particular Web site might submit a request with a specified amount of funding to keep the site running by paying for the continued operation of one or more resources operating the site. The resource may or may not be associated with a particular customer or owner, but any user may be able to provide (i.e., donate) funds to keep the resource active. The donated funds will not go into a user account in at least some situations, but instead will be applied to the specific resource and will extend the availability of that resource. In some embodiments a user can request that funds be applied to a future bill for that user or can apply funds from an account the user has with the resource provider, among other such options. In some embodiments a specific application programming interface (API) or other such mechanism can be provided for users to donate funds to a particular resource or set of resources. In some embodiments the funds can be applied to any resource associated with a specific operation, such as a Web site or application, or to a specific resource, such as a load balancer or application server used for that operation.

In some embodiments, the funds provided by a user may not be a donation but an investment where the user anticipates some return (e.g., valuable future consideration) on the amount of funds provided. A monetization service or other such system or entity can automatically handle the management of the investments and dividends. A set of policies can be provided to manage how much of a return a user can reasonably expect based on current and/or anticipated conditions, can provide the return when appropriate, and can provide a reporting of the reasons for the amount of any return. The amount donated can be a small, one-time investment or a recurring investment, among other such options. In addition to an amount or percentage related to the amount of the investment, a user can also, or alternatively, receive a portion of the revenue over a period of time sponsored, an amount of visibility through usage of the resource by others, or other such consideration. In some embodiments a resource might be provided that is anticipated to be funded totally through donations and/or investments, at least up to a certain level of profitability or another such criterion.

Various other applications, processes, and uses are presented below with respect to the various embodiments.

Figure 1:
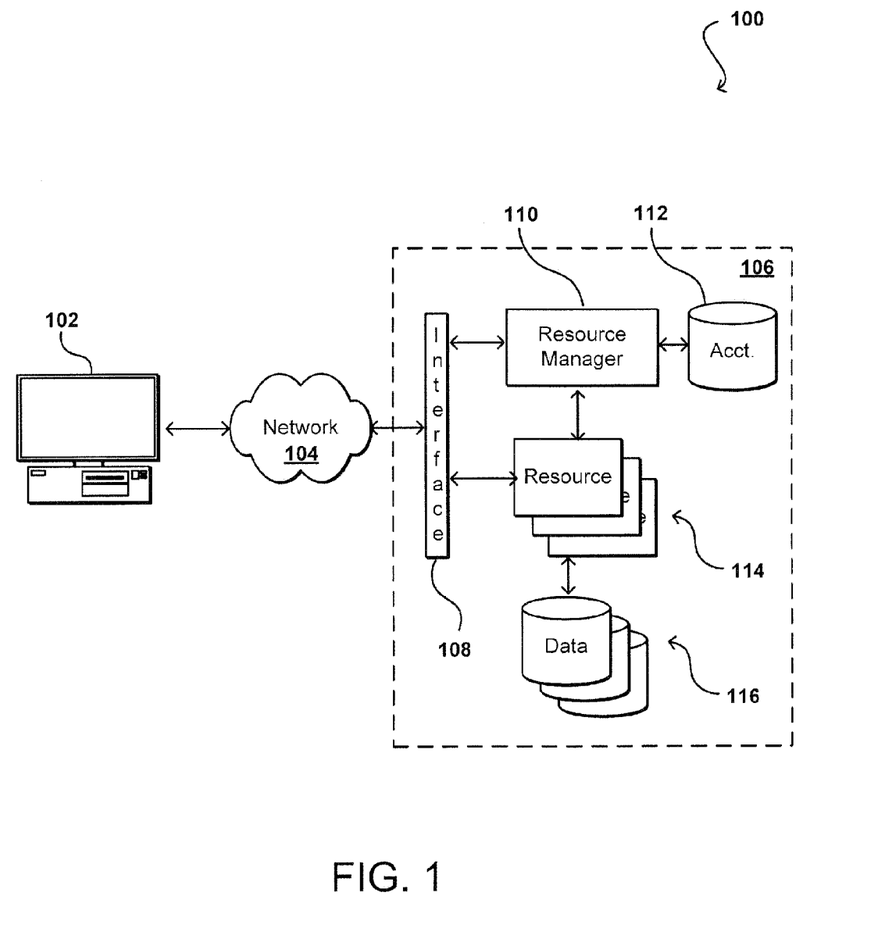
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The APT layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As can be seen, there are elaborate constructs built around aspects of the multi-tenant resource environment, such as identities, accounts, resource ownership, and resource access. In at least some situations, however, the elaborate nature of the environment can require unnecessary complexity and/or unnecessary steps when a user or customer of the provider environment wants short term access to a resource, and may not want to have to set up, and maintain, a full account with the provider. Similarly, the requirement for dedicated ownership and funding can limit the ability of certain customers of the resource provider to provide services to various users.

Accordingly, approaches in accordance with various embodiments can enable users to submit requests that include a source of funding, such as a digital cash payment, with a request. Such a request then can be processed and/or have resources allocated without requiring the user to first set up an account with the provider (although in some embodiments a user might first have to be a registered user of the provider environment). In at least some embodiments, particularly where the request is to perform a single task, the user may not even have to provide any type of identity signing a request, user credentials, or other such identifying information. As an example, a user might submit a request to obtain dedicated access to an application server instance for a period of two hours, and can provide digital cash with the request in the amount needed for the requested two hour period of time. Various types of digital cash, electronic money, or cryptocurrency can be used, such as Bitcoins provided by the Bitcoin P2P Currency System.

A resource manager 110 or other such component receiving such a request can verify the amount and authenticity of the digital cash, and if the amount is sufficient (and any other necessary criteria are met), the resource manager can provide the user with access to the requested resource. In at least some embodiments the resource manager can store information, such as an expiration time or capacity limit, in an appropriate accounting data store 112 or other such location. As long as an expiration criterion has not been reached, the user (or other users granted access to the resource) can utilize the allocated resource(s). As discussed, such an approach enables a user to obtain access to various multi-tenant resources without requiring those resources to be tied to a particular user account.

In at least some embodiments the allocated resources may also not be associated with the user who submitted the payment and/or requested allocation of the resources, and in fact the user may not have been identified to the system in some embodiments. Such "anonymously spawned" resources can be requested and allocated for access by one or more users, but might not be associated with any of those users. As an example, a user might want to pay for resources to support a publicly accessible Web site or social networking service, but does not want to be the "owner" responsible for those resources or the site. The user could submit a request for the appropriate resources and/or resource capacity, and can let others utilize those resources. These resources can be considered to be "orphaned" as they do not have an associated owner.

In the above example, the orphaned resource was anonymously spawned as the user who submitted payment did not tie those resources to that user or a respective user account. It is also possible that a user might have a dedicated set of resources that are tied to that user, but after some period of time the user does not want to be responsible for those resources any longer. In such an example, the user can submit a request to have those resources no longer associated with that user, or can simply let an expiration criterion be met without renewal such that the user's account is no longer charged for, and associated with, those resources.

Systems and methods in accordance with various embodiments, however, can enable a user to provide payment to extend the availability of those resources. For example, an owner of a Web site used by many users may no longer wish to be responsible for payment for the maintenance of the site. The owner in such an example can cause the resources to no longer be "owned" by the owner, but can submit additional requests with payment that enable the period of time to be extended. Thus, a user might not want to be on the hook for a long term contract, for example, but may be willing to keep the resources available as long as the owner has the funds to do so. The former owner then can, at any time before the expiration period ends, or access is otherwise denied, submit a request with a digital payment to cause the expiration period to be extended. In some embodiments, the resources might be available for a period of time after the expiration time, or might not be reimaged or allocated to others for a period of time, to enable the former owner to have those resources available again if payment is submitted within a designated period of time (or until those resources are otherwise needed for other purposes).

In some embodiment, there might be an initial payment up front to obtain the resource allocation, then each subsequent request to utilize that allocation must include an amount of funding in order to be processed. The amount can be a fixed amount, a minimum amount, or an amount proportional to an amount of work needed to process the request.

Figure 2:
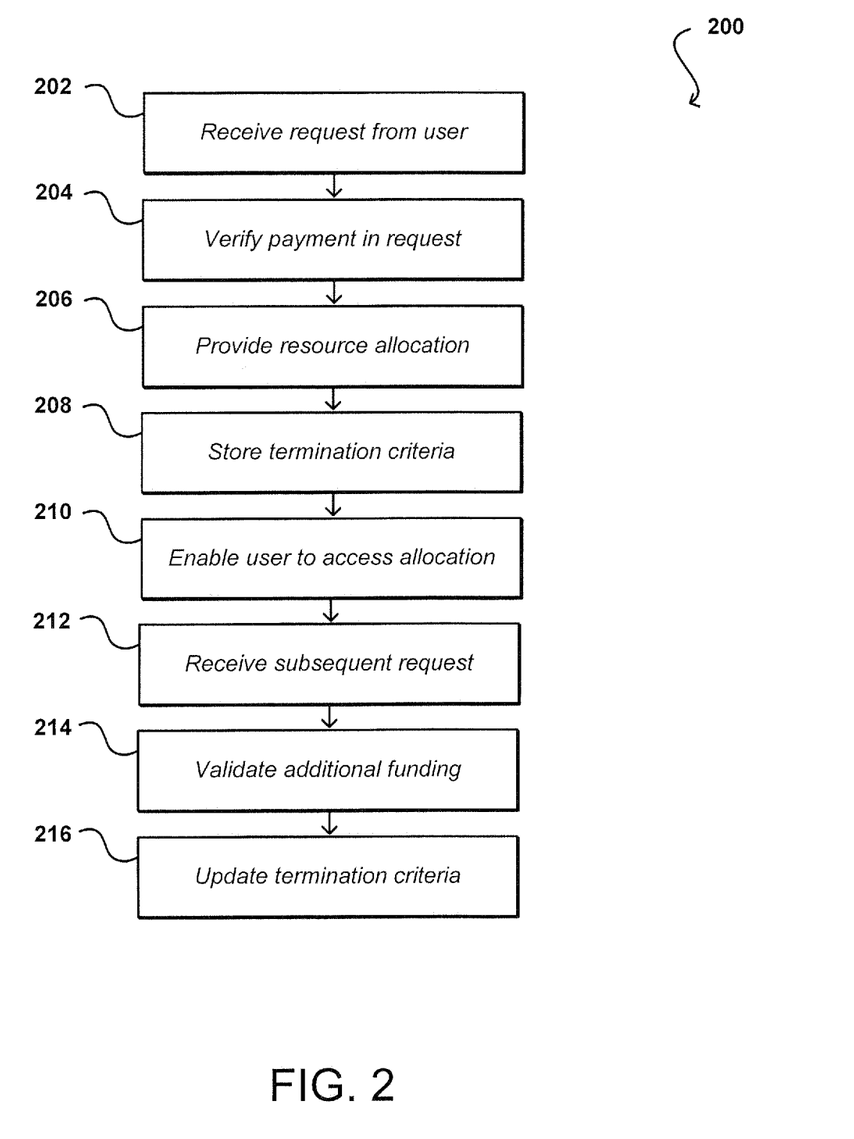
FIG. 2 illustrates an example process for funding a resource that can be used in accordance with various embodiments.

FIG. 2 illustrates an example process 200 for funding a resource that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a request is received 202 from a user to obtain a resource allocation. As discussed, the request can include payment or specify a source of funding, among other such options. The submitted funding can be verified 204, such as by determining an amount digital cash provided or verifying an account number, where that account can be with an entity other than the resource provider (e.g., a financial institution). At a time after the funding is validated, the resource allocation can be provided 206 for the user. As discussed, the resource allocation may not be associated with the user, but will be accessible as long as there is sufficient funding for the allocation. One or more termination criteria can be stored 208 for the resource allocation. As discussed, this can include an amount of time, an amount of data transfer or processing, or another such value. The user then can be enabled 210 to access the resource allocation while there is sufficient funding. At some point during that period, another request can be received 212 from the user with additional funding. The additional funding can be validated 214, and if valid the stored termination criteria can be updated 216 such that the allocation will remain available for additional usage.

It may also be the case, however, that other users might want to provide funding to keep certain resources available. For example, a first user might submit one or more requests with payment to operate a Web site using resources of a provider environment. If the first user is no longer able to support the Web site, other users of the site can submit requests with digital funds in order to keep the site available through those resources for at least a determined amount of time. In some embodiments, a resource manager or other such component can provide information with the site indicating how long the site will be available, and enabling users to submit requests with payment to extend the lifetime of the site. Various users can thus provide funding or "donations" to keep the site available. Other resource usage can be funded by donations as well, such as the storing of data, providing of an application environment, and the like. In such an embodiment, a user can provide a donation for a specific task supported by a group of resources, or can potentially provide a donation for a specific resource or resource instance.

Figure 3:
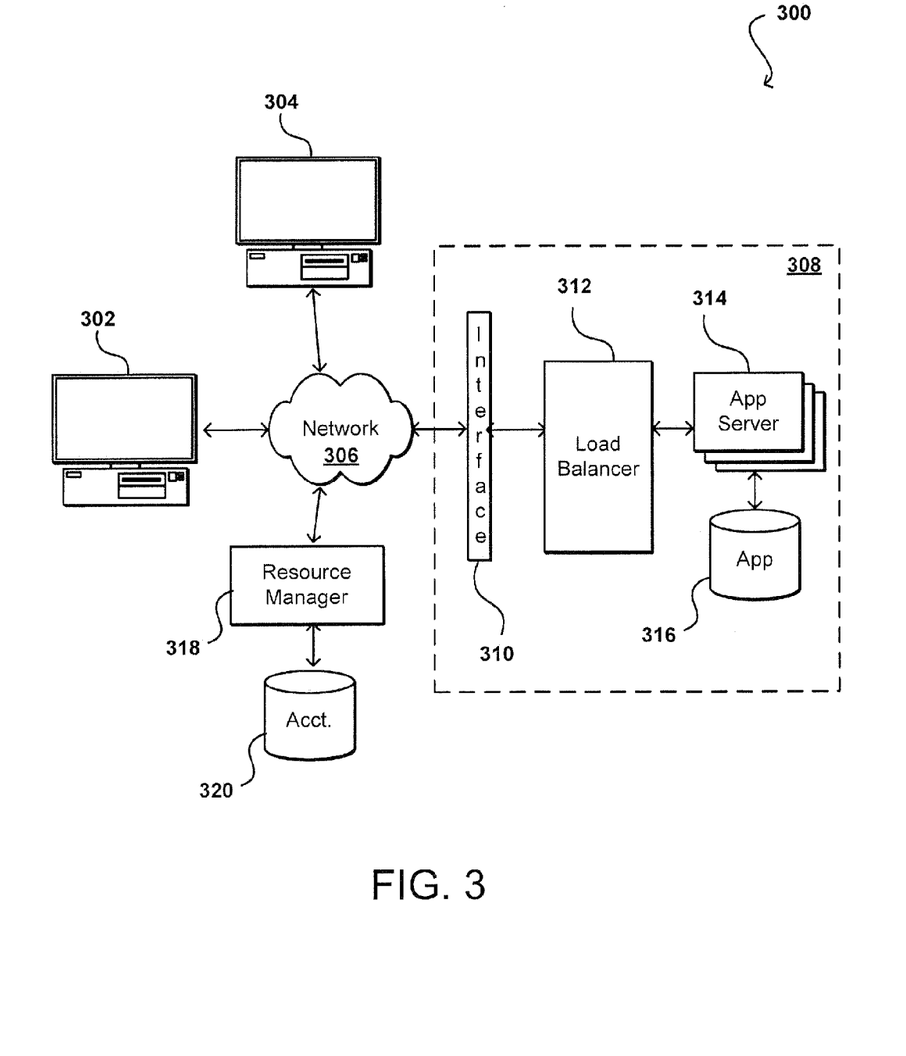
FIG. 3 illustrates an example environment wherein users are able to sponsor or invest in the operation of certain components in accordance with various embodiments.

For example, FIG. 3 illustrates an example situation 300 wherein multiple users of different client devices 302, 304 are able to submit requests with payments for one or more resources in a multi-tenant resource environment 308. In this example, a first user of a first device 302 submits a request with payment across a network that is received to a resource manager 318. The resource manager is shown to be outside the resource environment 308 in this example, although the manager could be inside the environment as well in other embodiments. The first request from the first user could provide payment to have an amount of resource capacity available. Upon validation and other processes discussed and suggested elsewhere herein, the resource manager 318 can cause the appropriate resources to be allocated in the provider environment 308, can store time information for the allocation to at least one data store 320, and can provide an identifier or address enabling the user to access those resources. In this example, the resources requested include at least a portion of a load balancer 312, a number of application servers 314, and an amount of storage in at least one data store 316. As discussed, the first user can submit additional requests to keep the resources available for an extended period of time, where information for those requests will be received by the resource manager 318 and the information in the data store 320 updated accordingly.

As mentioned, however, a second user of the second device 304 can also submit requests with payment or funding that can be applied to extend the availability of those resources. In one example, the second user can submit an amount to generally be applied to the availability of those resources. The request can specify a period to keep those resources available, for example, or might instead include an amount of funding to be applied, which will extend the availability of the resources by an amount proportional to the amount of funding supplied. Users can also submit donations in any appropriate amount, from a dollar to thousands of dollars, etc.

In some embodiments, a user might submit a donation that specifies a specific resource or aspect for which the donation is to be applied. For example, a Web site might store data that a user wants to make sure is maintained. The user might not care if the information is always available over a network, but might want to make sure that the data is never lost and as such can submit requests indicating that the funds are to be applied to maintaining the data store 316. In some embodiments, a user might supply a credit card number or other account information enabling the user to provide recurring donations, or donations when there is otherwise not enough funding to support the data maintenance. In this example, a user can actually adopt a resource that was initially provisioned by another user, where the adopting user still does not own the resource but can be charged for its availability. Such a resource can still stand on its own, and can be maintained and available as long as someone pays for the availability. A dedicated interface can be provided for a new type of request, such as an "add funds to resource" request or something similar.

In some cases, the resources might actually be strongly owned by the first user, but any other user can submit donations to keep the resources available. For example, the owner might be in control of content available on the resources and be responsible for the resources, but other users can submit donations with requests to the owner of the resource, to the resource provider for maintaining the resource, a group running a specific set of the resource, or another such option. A trackable and/or billable API can be used to enable any user to submit digital cash through a Web services request, or similar request, in order to support the availability of the resources. Requests received with digital cash thus can be completely anonymous donations. In some embodiments, the donations can be received by other customers of the provider environment, where the source of funding can be account information for those customers. Thus, the customers can request to have a portion of the cost of those resources billed to their account by the resource provider, instead of providing a pre-paid API call or other such request that includes the payment.

In at least some embodiments, a resource provider can enable users to establish resource allocations that are intended to be funded primarily and/or completely through donations. For example, a public service Web site might request its users to provide donations. In some cases, a user can register with the site and can receive requests for donations when the funding is low. A user starting the site might need to provide an initial payment with the initial request, or the provider might allow the resources to be available for a period of time to enable the site to receive donations. In some embodiments the resource can be allocated when requested but not available to the public until a sufficient amount of donation is received. In some embodiments, the resources in a donation-dependent model might have the ability to have credit extended for limited periods of time in order to keep the resources available when funding runs low. Various other approaches can be used as well within the scope of the various embodiments.

In some embodiments a customer can specify rules, policies, and/or criteria whereby donations can be automatically provided. For example, a customer might decide to pay up to a fixed amount per month to support a resource allocation if the donations for the month fall short. The customer might set a minimum amount, such as $10 a month, to be billed automatically for the allocation, with up to an additional amount being charged to that customer if the donations are below the amount needed for the allocation. A customer also can request notification when donations fall short, such that the customer can determine whether to provide digital cash or have a portion billed to that customer's Web services account, etc.

Figure 4:
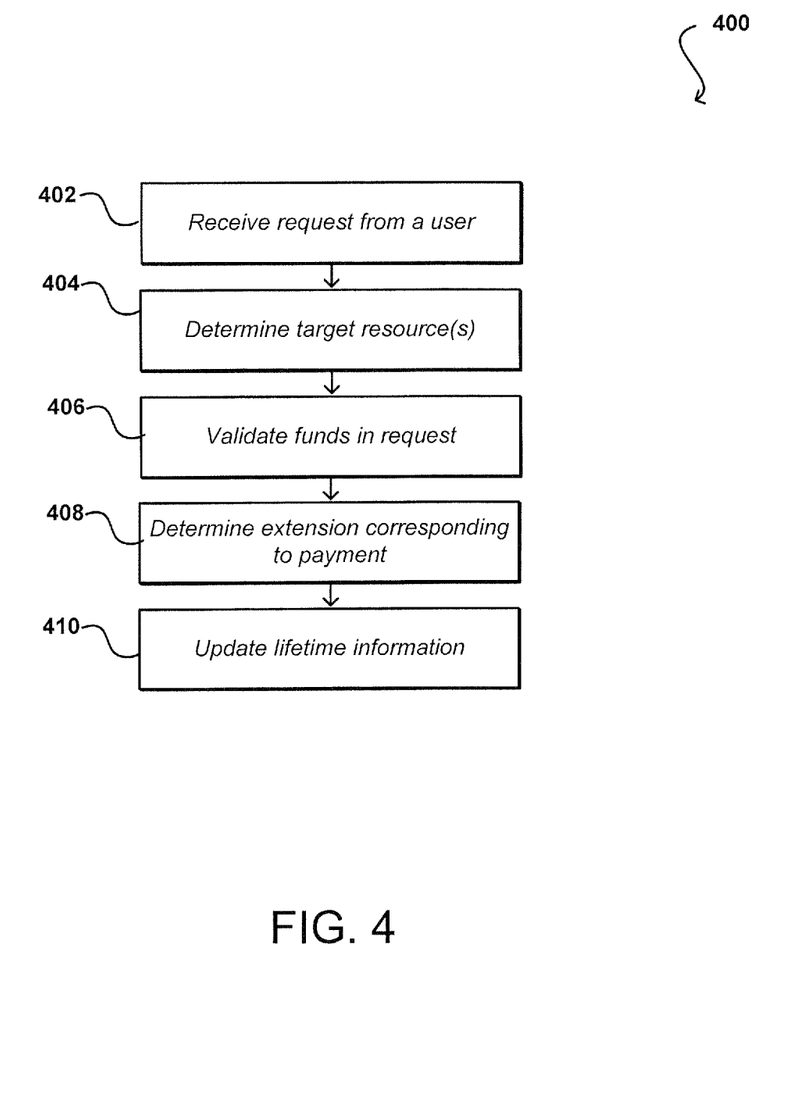
FIG. 4 illustrates an example process for funding a resource through donations that can be utilized in accordance with various embodiments.

FIG. 4 illustrates an example process 400 for funding resources by donation that can be used in accordance with various embodiments. In this example, a request is received 402 from a user that is not a user associated with a resource allocation (if any is associated). This request can be received to a funding API or other such interface. A determination can be made 404 as to the target resource(s) specified by the request. As discussed, the request can specify a specific resource or type of resource, a group of related resources, or another such allocation. Payment submitted with the request can be verified 406, such as by verifying the integrity and amount of an object of digital cash. At a time after payment is verified, an extension to the lifetime of the target resource(s) can be determined 408. The extension can include, for example, additional time, capacity, or throughput, among other such options. Upon determining the extension, lifetime information for the target resource(s) can be updated 410 accordingly. If this request is an initial request for a resource allocation, an initial lifetime value can be determined and stored that corresponds to an amount of the donation.

In some embodiments, donations may not be sufficient to support the resources needed for a certain task. In some cases, one or more users may also want something in return for their support. Accordingly, systems and methods in accordance with various embodiments can utilize a monetization layer, monetization service, or other such component that can work with, separate from, or as part of the resource manager to manage the accepting of investments from one or more users, as well as providing the return on that investment. A monetization layer in at least one embodiment includes one or more application servers and at least one data store, enabling the layer to receive and process financial data, and perform other such tasks as discussed herein.

As a first example, a user might provide an amount of funding by providing digital cash with a request, providing an account number, or through another such mechanism. In return the user can expect to receive a certain amount or percentage related to the funding at some future point in time. For example, a user submitting a $1 might expect to receive back $1.10 at some point when a profit is available to distribute. Similarly, a user paying for an hour of resource availability might anticipate a percentage of the revenue generated using those resources over that hour, such as 80% of the advertising revenue. In some embodiments, a user agreeing to a certain level of support might receive a percentage of ownership, shares in the site or application provided using the resources, or other such consideration.

In some embodiments, a user can obtain a certain level of visibility in response to the investment, either instead of, or in addition to, monetary compensation. For example, a user might be able to have a "sponsored by" tag displayed on a page provided by the resources. The user also may be able to provide banner ads or other such advertising through pages or interface portions provided by the resources for at least a period of the sponsorship. Various other forms of compensation can be provided as well within the scope of the various embodiments.

In at least some embodiments, one or more policies can be used to determine the return to be provided based on an amount of sponsorship. The return can be guaranteed or estimated, and the type of return can depend at least in part upon an amount of the sponsorship. For example, a user submitting a $1 digital payment with a request might anticipate getting up to $1.25 back over a period of time, and a user agreeing to pay for the application servers for a month might receive 25% of the profit over that month. The policies can be publicly accessible, such that users can know the terms before they invest, and can determine how much to invest based on the tiers or levels of sponsorship. As should be understood, there can be various regulations governing such investments, and the policies can be implemented so as to comply with these regulations.

An advantage of a monetization layer and payment approach such as those discussed herein is that a user can invest in a business or opportunity without the need for formal paper contracts, lawyer or broker fees, and the like. A user can instead submit a request to sponsor a load balancer for a month, for example, in return for a percentage (e.g., 5%) of the revenue of a site utilizing that load balancer, etc. A user can choose a level and type of sponsorship, and the monetization layer can manage the investment and return. The user can have the ability to submit requests to the monetization layer, or another such component, for a reporting on performance, updated anticipated return, or other such information.

In at least some embodiments an investment framework can provide a Web page or other location where users can view information about the content provided by a resource allocation, and can view information about different types or levels of sponsorship. In some embodiments, a single Web site might be provided that enables users to view different groups of resources for different applications, sites, or content, such that the users can determine which sites need donations, can compare returns for different resource groups, and the like. The ordering and/or inclusion of specific sites or applications on the list can depend upon factors such as the amount of donation needed, the amount of anticipated return, and other such information. A special section might display information for sites that are in danger of being shut down if donations are not received in the near future. Various other types and arrangements of information can be displayed as well within the scope of the various embodiments.

In one example, a developer might be looking for assistance with a new Web site and is looking for investors to help get the site going. Users can choose to invest in the site, and in some cases a monetization layer can automatically provide a portion of the revenue to those users when revenue is received. The monetization layer can monitor the remaining amounts as well as levels of profitability, and in at least some embodiments can stop taking investments and/or terminate dividends when certain financial goals are reached or other criteria met.

In some embodiments users can bid for certain time slots in order to obtain a certain amount of investment or certain anticipated level of return. For example, during peak hours there might be a relatively high anticipated return on investment, but there might be multiple interested investors such that the level of investment likely will be relatively high. During off hours, there might be a lower anticipated return but fewer bidders so the amount of investment might be lower. A monetization layer can accept bids, which can specify an amount to be provided in the future or can contain digital cash, among other such options. At some time before the funds are to be applied, the monetization layer can select a winning bidder using one or more appropriate selection criteria, such as amount of bid, type of user, type of return requested, and other such factors. The monetization layer then can obtain the funds (or promise of funds) after the winning bid is selected, and can monitor the performance during the time of sponsorship. The monetization layer then can provide the return after (or during) the time of sponsorship. A user can also choose to apply at least a portion of the return to future investments. In some embodiments, multiple users can sponsor a common period of time, whether sponsoring different resources or splitting the overall cost for the resources.

In some embodiments users can submit bids that include not only different amounts of payment but also different requested returns. For example, a first user might offer 1K for a 50% share, and a second user might offer 1.25K for a 75% share. Even though the second bid is higher, it might be more advantageous to accept the first bid that will require a much smaller return on those dollars. There also might be a minimum amount that the investor can bid, such as the cost of operation during the time period. One or more optimization algorithms can be used to select a bid that is most advantageous to the site owner (or other such party) based on various selection criteria.

Figure 5:
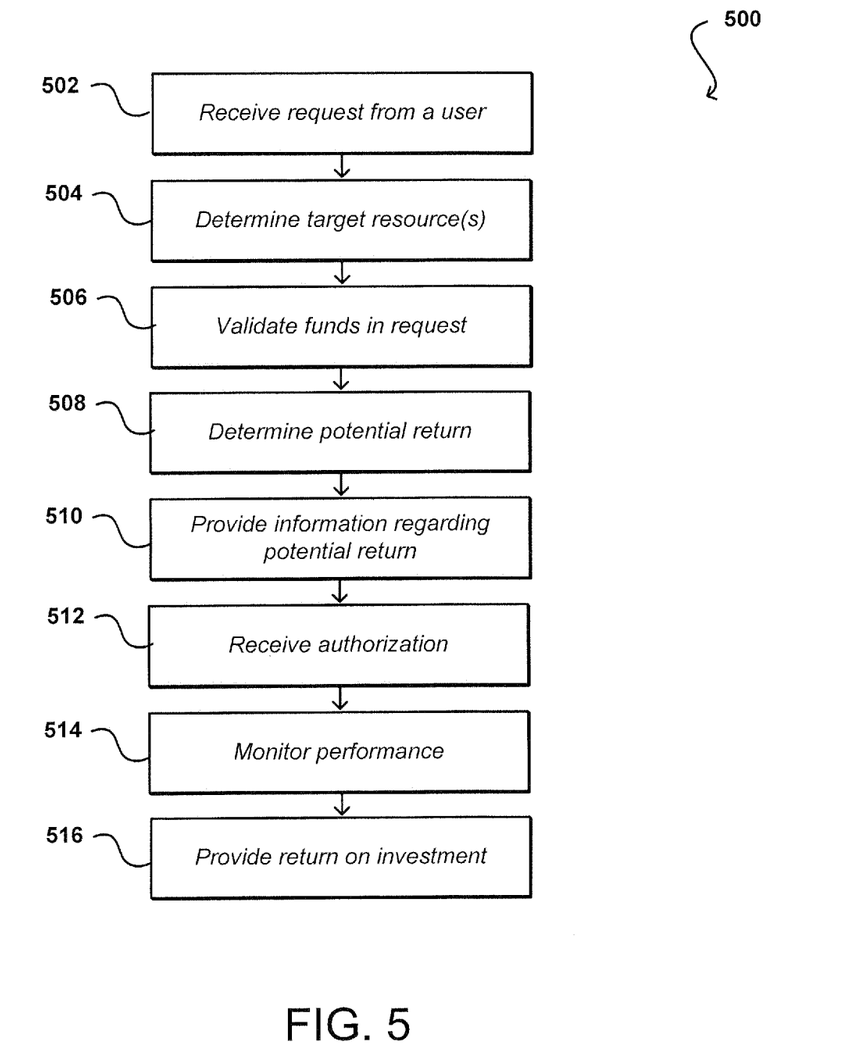
FIG. 5 illustrates an example process for funding a resource through donations that can be utilized in accordance with various embodiments.

FIG. 5 illustrates an example process 500 for investing in a resource that can be utilized in accordance with various embodiments. In this example, a request to invest is received 502 from a potential investor. A determination can be made 504 as to the target resource(s) specified by the request, and an amount of funds specified by the request can be validated 506. In some embodiments this can be a fixed amount, while in other embodiments this can be a bid amount including one or more bid values. In at least some embodiments, a potential return on the amount of funds can be determined 508 and provided to the potential investor 510. In some embodiments where the investor specifies a specific amount of return or the amount of return is determined ahead of time, the system might go ahead and accept the investment without confirmation by the investor. In embodiments where the anticipated return can vary over time, however, it can be desirable in at least some systems to provide the investor with the estimated return such that the investor can determine whether to proceed. Return on investment can vary based upon factors such as revenue and usage fluctuations, amount of advertising, number of other sponsors for a given period, etc. If the estimate is provided and confirmation or authorization is received 512 from the investor, the funds can be applied to the operation of the target resources. A monetization layer or other such system can monitor 514 a performance with respect to the target resource(s), such as an amount of revenue received, an operating cost, and other such information. At such time when at least part of the agreed-upon compensation is available, at least part of the return on investment can be provided 516 to the investor.

In some embodiments resources may also have some control over their own funding. For example, a Web site provided using a set of resources can have the ability to increase an amount or type of advertising when additional funding is needed. Similarly, an application can adjust an amount of resources available based on an amount of funding. For example, if funding is running low the site might reduce the storage or computing capacity needed for a period of time in order to reduce resource costs. As discussed, a system can also potentially request donations or investments as funding runs low. At least one monitoring component can attempt to ensure sufficient funding at all times, and can use various policies or metrics to determine when to adjust one or more aspects of the resource usage.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIGS. 1 and 2. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
   at least one device processor; and
   memory including instructions that, when executed by the at least one processor, cause the system to:
   receive a request to obtain an amount of capacity in a multi-tenant resource environment, the amount of capacity capable of being accessed by a plurality of users;
   receive requests from a plurality of investors, the requests containing payment to support access to the amount of capacity;
   track funds supplied by each of the plurality of investors during at least an initial startup phase where revenue does not meet a specified criterion, the funds being based at least in part on the payment received from the plurality of investors;
   monitor a level of funding of the amount of capacity;
   based at least in part upon an amount of funds supplied by each of the plurality of investors, apportion an amount of future consideration among the plurality of investors; and
   initiate at least one of sending requests to at least a portion of the plurality of investors when the level of funding falls below a minimum threshold, the requests prompting the at least a portion of the plurality of investors to provide additional funds, or throttling access to a set of resources corresponding to the amount of capacity provided by the multi-tenant resource environment.

2. The system of claim 1, wherein the amount of future consideration includes a percentage of ownership, a percentage of revenue over a period of time, or a fixed amount of return.

3. The system of claim 1, wherein users are also able to invest in the amount of capacity by submitting electronic payment with requests to the amount of capacity.

4. The system of claim 3, wherein a type of future consideration provided to the users depends at least in part upon an amount of the electronic payment.

5. The system of claim 1, wherein the instructions when executed further cause the system to:
   enable an application executing on the system to adjust at least one aspect of a set of resources provided the multi-tenant resource environment, including at least one of reducing a capacity or throughput of the set of resources, or increasing an amount of advertising displayed through usage of the set of resources.

6. The system of claim 1, further comprising:
a plurality of application programming interfaces (APIs) configured to receive requests from investors, the APIs being programmable to enable selection of specific selection criteria.

7. A computer implemented method, comprising:
receiving requests from a plurality of investors, the requests containing an amount of funds used to support access to an amount of capacity in a multi-tenant resource environment, the amount of capacity capable of being accessed by a plurality of users;
tracking, by a computer system that includes a processor coupled to a memory, the amount of funds supplied by each of the plurality of investors during at least an initial startup phase where revenue does not meet a specified criterion;
monitor, by the computer system, a level of funding of the amount of capacity; providing information regarding how each of the plurality of investors will be apportioned an amount of future consideration in return for the amount of funds;
based at least in part upon the amount of funds supplied by each of the plurality of investors, apportioning the amount of future consideration among the plurality of investors; and
initiate at least one of sending, by the computer system, requests to at least a portion of the plurality of investors when the level of funding falls below a minimum threshold, the requests prompting the at least a portion of the plurality of investors to provide additional funds, or throttling access to a set of resources corresponding to the amount of capacity provided by the multi-tenant resource environment.

8. The computer implemented method of claim 7, wherein the amount of future consideration includes a percentage of ownership, a percentage of revenue over a period of time, or a fixed amount of return.

9. The computer implemented method of claim 7, wherein users are able to invest in the amount of capacity by submitting electronic payment with requests to the amount of capacity.

10. The computer implemented method of claim 7, wherein users are able to invest in the amount of capacity by submitting electronic payment with requests to the amount of capacity.

11. The computer implemented method of claim 10, wherein a type of future consideration provided to the users depends at least in part upon an amount of the electronic payment.

12. The computer implemented method of claim 7, further comprising:
throttling access to a set of resources provided by the multi-tenant resource environment when a level of usage exceeds the level of funding.

13. The computer implemented method of claim 7, further comprising:
enabling an application executing in the multi-tenant resource environment to adjust at least one aspect of a set of resources provided by the multi-tenant resource environment, including at least one of reducing a capacity or throughput of the set of resources, or increasing an amount of advertising displayed through usage of the set of resources.

14. The computer implemented method of claim 7, further comprising:
receiving requests from investors at a plurality of application programming interfaces (APIs) the APIs being programmable to enable selection of specific selection criteria.

15. A non-transitory computer readable storage medium storing one or more sequences of instructions executable by one or more processors to perform a set of operations comprising:
receiving a request from an investor of a plurality of investors to a monetization layer of a multi-tenant resource environment to obtain an amount of capacity, the amount of capacity capable of being accessed by a plurality of users, the request including bid information for the amount of capacity, a period of time, revenue and an amount of investment;
comparing the bid information for the investor to other bid information submitted by the plurality of investors;
selecting the bid information as a winning bid when the bid information meets at least one selection criterion;
in response to selecting the bid information as the winning bid, applying the amount of investment to operation of the amount of capacity during the period of time and providing the user with an amount of consideration for the amount of investment over the period of time;
monitoring a level of funding of the amount of capacity; and
initiate at least one of sending requests to at least a portion of the plurality of investors when the level of funding falls below a minimum threshold, the requests prompting the at least a portion of the plurality of investors to provide additional funds, or throttling access to a set of resources corresponding to the amount of capacity provided by the multi-tenant resource environment.

16. The non-transitory computer readable storage medium of claim 15, further comprising instructions executed by the one or more processors to perform the operations of:
throttling access to a set of resources provided by the multi-tenant resource environment when a level of usage exceeds the level of funding.

17. The non-transitory computer readable storage medium of claim 15 further comprising instructions executed by the one or more processors to perform the operations of:
enabling an application executing on the multi-tenant resource environment to adjust at least one aspect of a set of resources provided by the multi-tenant resource environment when a level of usage exceeds the level of funding, including at least one of reducing a capacity or throughput of the set of resources, or increasing an amount of advertising displayed through usage of the set of resources.

* * * * *